(12) United States Patent
Porter (10) Patent No.: US 6,672,420 B2
(45) Date of Patent: Jan. 6, 2004

(54) ELECTRONICALLY-CONTROLLED COUPLING FOR ALL-WHEEL DRIVE SYSTEM

(75) Inventor: Fred C. Porter, Beverly Hills, MI (US)

(73) Assignee: New Venture Gear, Inc., Troy, MI (US)

(*) Notice: Subject to any disclaimer, the term of this patent is extended or adjusted under 35 U.S.C. 154(b) by 0 days.

(21) Appl. No.: 10/441,991

(22) Filed: May 20, 2003

(65) Prior Publication Data

US 2003/0196844 A1 Oct. 23, 2003

Related U.S. Application Data

(63) Continuation of application No. 10/022,495, filed on Dec. 17, 2001, now Pat. No. 6,578,654.
(60) Provisional application No. 60/281,888, filed on Apr. 5, 2001.

(51) Int. Cl.⁷ .............................................. B60K 17/344
(52) U.S. Cl. .......................................... 180/249; 475/86
(58) Field of Search ................................. 180/233, 248, 180/249, 250; 475/84, 86, 87, 88; 701/82, 88, 89

(56) References Cited

U.S. PATENT DOCUMENTS

| | | |
|---|---|---|
| 4,031,780 A | 6/1977 | Dolan et al. |
| 4,650,028 A | 3/1987 | Eastman et al. |
| 4,840,247 A | 6/1989 | Kashihara et al. |
| 4,866,624 A | 9/1989 | Nishikawa et al. |
| 4,895,236 A | 1/1990 | Sakakibara et al. |
| 4,950,214 A | 8/1990 | Botterill |
| 5,086,867 A | 2/1992 | Hirota et al. |
| 5,301,769 A | 4/1994 | Weiss |
| 5,366,419 A | 11/1994 | Oda |
| 5,411,447 A | 5/1995 | Frost |
| 5,690,201 A | 11/1997 | Gassmann |
| 5,699,888 A | 12/1997 | Showalter |
| 5,904,632 A | 5/1999 | Brown |
| 5,910,064 A | 6/1999 | Kuroki |
| 5,964,126 A | 10/1999 | Okcuoglu |
| 5,967,285 A | 10/1999 | Mohan et al. |
| 6,009,968 A | 1/2000 | Kouno |
| 6,041,903 A | 3/2000 | Burns et al. |
| 6,076,646 A | 6/2000 | Burns |
| 6,095,939 A | 8/2000 | Burns et al. |
| 6,112,874 A | 9/2000 | Kopp et al. |
| 6,142,905 A | 11/2000 | Brown |
| 6,155,947 A | 12/2000 | Lowell |
| 6,158,303 A | 12/2000 | Khiraishi et al. |
| 6,186,258 B1 | 2/2001 | Deutschel et al. |
| 6,315,097 B1 | 11/2001 | Burns |
| 6,578,685 B2 * | 6/2003 | Porter .......................... 192/35 |
| 6,580,994 B2 * | 6/2003 | Katayama et al. ............ 701/69 |
| 2001/0025734 A1 | 10/2001 | Nishida et al. |

FOREIGN PATENT DOCUMENTS

JP          62231821 A          10/1987

* cited by examiner

Primary Examiner—Kevin Hurley
(74) Attorney, Agent, or Firm—Harness, Dickey & Pierce, P.L.C.

(57) ABSTRACT

A drive axle for an all-wheel drive vehicle includes an adaptively controlled first hydraulic coupling for providing front-to-rear torque transfer control and a passively controlled second hydraulic coupling for providing side-to-side limited slip and torque biasing control. The drive axle is contained with a common housing and communicates with a tractor control system to actively control actuation of the first hydraulic coupling based on the operating characteristics of the vehicle as detected by suitable sensors.

27 Claims, 8 Drawing Sheets

ELECTRONICALLY-CONTROLLED COUPLING FOR ALL-WHEEL DRIVE SYSTEM

CROSS-REFERENCE TO RELATED APPLICATIONS

This application is a continuation of U.S. patent application Ser. No. 10/022,495 filed Dec. 17, 2001, Pat. No. 6,578,654 which claims the benefit of U.S. Provisional Application No. 60/281,888 filed Apr. 5, 2001.

FIELD OF THE INVENTION

The present invention relates generally to hydraulic couplings for use in motor vehicle driveline applications for limiting slip and transferring torque between rotary members. More specifically, a drive axle assembly for an all-wheel drive vehicle is disclosed having a pair of hydraulic couplings each having a fluid pump, a multi-plate clutch assembly, and a fluid distribution system operable to control actuation of the clutch assembly.

BACKGROUND OF THE INVENTION

In all-wheel drive vehicles, it is common to have a secondary drive axle that automatically receives drive torque from the drivetrain in response to lost traction at the primary drive axle. In such secondary drive axles, it is known to provide a pair of clutch assemblies connecting each axleshaft to a prop shaft that is driven by the drivetrain. For example, U.S. Pat. No. 4,650,028 discloses a secondary drive axle equipped with a pair of viscous couplings. In addition, U.S. Pat. Nos. 5,964,126, 6,095,939, 6,155,947 and 6,186,258 each disclose secondary drive axles equipped with a pair of pump-actuated multi-plate clutch assemblies. In contrast to these passively-controlled secondary drive axles, U.S. Pat. No. 5,699,888 teaches of a secondary drive axle having a pair of multi-plate clutches that are actuated by electromagnetic actuators that are controlled by an electronic control system.

In response to increased consumer demand for motor vehicles with traction control systems, hydraulic couplings are currently being used in a variety of driveline applications. Such hydraulic couplings rely on hydromechanics and pressure-sensitive valve elements to passively respond to a limited range of vehicle operating conditions. These hydraulic couplings are susceptible to improvements that enhance their performance, such as a more controlled response to a wider range of vehicle operating conditions. With this in mind, a need exists to develop improved hydraulic couplings that advance the art.

SUMMARY OF THE INVENTION

Accordingly, the present invention provides a hydraulic coupling for use in motor vehicle driveline applications for rotatively coupling a pair of rotary members to limit speed differentiation and transfer drive torque therebetween.

Another object of the present invention is to provide a drive axle assembly equipped with a pair of hydraulic couplings which are operably arranged for coupling a vehicle drivetrain to a pair of axleshafts.

In carrying out the above object, the drive axle assembly of the present invention includes a first hydraulic coupling operably disposed between the prop shaft and the pinion shaft, and a second hydraulic coupling installed in a differential drive module. The differential drive module includes a drive case driven by the pinion shaft, a bevel-type differential unit interconnected between the drive case and a pair of axleshafts, and the second hydraulic coupling is operably disposed between the drive case and at least one of the axleshafts.

The first hydraulic coupling generally includes a multi-plate clutch assembly operatively connecting a pair of rotary members, an actuator assembly for actuating the clutch assembly, and a fluid control system operable for controlling actuation of the actuator assembly. The actuator assembly includes a hydraulic pump and a piston mounted in a piston chamber for movement relative to the multi-plate clutch assembly. The fluid control system regulates the fluid pressure supplied to the piston chamber by the hydraulic pump to control the clutch engagement force exerted by the piston on the clutch assembly. The fluid control system includes an electrically-controlled flow control valve operable for regulating the fluid pressure delivered to the piston chamber. Preferably, the flow control valve is a pulse-width modulated (PWM) valve having a moveable valve element. The position of the valve element is controlled by an electronic traction control module that monitors and responds to certain vehicle operating conditions including, without limitation, a sump fluid temperature, a coupling outlet oil temperature, the four wheel speeds, and the piston chamber pressure. The electronic traction control module sends a control signal to the PWM control valve for modulating the hydraulic pressure supplied to the piston chamber, which, in turn, controls clutch engagement.

BRIEF DESCRIPTION OF THE DRAWINGS

Further objects, features and advantages of the present invention will become readily apparent from the following detailed specification and the appended claims which, in conjunction with the drawings, set forth the best mode now contemplated for carrying out the invention. Referring to the drawings:

DETAILED DESCRIPTION OF THE PREFERRED EMBODIMENTS

In general, the present invention is directed to a hydro-mechanical limited slip and torque transfer device, hereinafter referred to as a drive axle assembly, for use in connecting the drivetrain to a pair of axleshafts associated with a secondary driveline of an all-wheel drive vehicle. However, the drive axle assembly can also find application in other driveline applications including, but not limited to, limited slip differentials of the type used in full-time transfer cases and front-wheel drive transaxles. Furthermore, this invention advances the technology in the field of actively-controlled hydraulically-actuated couplings of the type requiring pressure relief and thermal unloading to prevent damage to the driveline components.

Figure 1:
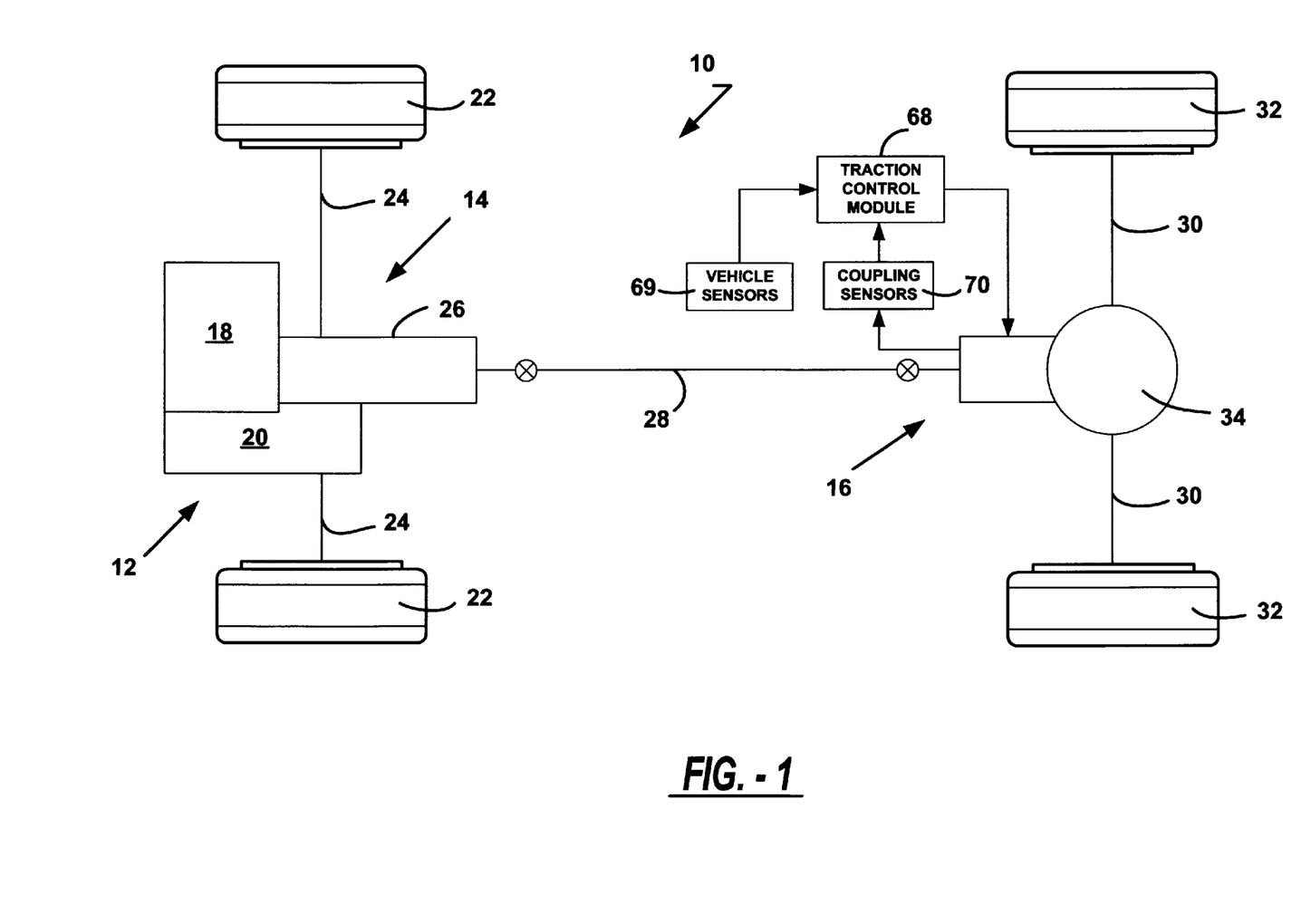
FIG. 1 is a schematic view of a motor vehicle drivetrain equipped with a secondary drive axle assembly constructed in accordance with the present invention.

With reference to FIG. 1, a schematic layout for a vehicular drivetrain 10 is shown to include a powertrain 12 driving a first or primary driveline 14 and a second or secondary driveline 16. Powertrain 12 includes an engine 18 and a transaxle 20 arranged to provide motive power (i.e., drive torque) through a front differential (not shown) to a pair of wheels 22 associated with primary driveline 14. In particular, primary driveline 14 includes a pair of halfshafts 24 connecting wheels 22 to the front differential associated with transaxle 20. Secondary driveline 16 includes a power take-off unit (PTU) 26 driven by transaxle 20, a prop shaft 28 driven by PTU 26, a pair of axleshafts 30 connected to a pair of wheels 32, and a drive axle assembly 34 operable to transfer drive torque from propshaft 28 to one or both axleshafts 30.

Referring to FIGS. 2 through 7, the components associated with drive axle assembly 34 will be now detailed. Drive axle assembly 34 includes a multi-piece housing 40, an input shaft 42, a first hydraulic coupling 44, and a rear differential drive module 46. Input shaft 42 is rotatably supported in housing 40 by a bearing assembly 48 and sealed relative thereto via a seal assembly 50. A yoke 52 is secured to input shaft 42 and is adapted for connection to propshaft 28. Drive module 46 includes a pinion shaft 54, a bevel-type differential gearset 56, a pair of output shafts 58 and 60 adapted for connection to axleshafts 30, and a second hydraulic coupling 62. In operation, first hydraulic coupling 44 is operable to transfer drive torque from input shaft 42 to pinion shaft 54 in response to excessive interaxle speed differentiation between propshaft 28 and differential gearset 56. Second hydraulic coupling 62 is operable to limit intra-axle slip in response to excessive speed differentiation between output shafts 58 and 60.

Figure 2:
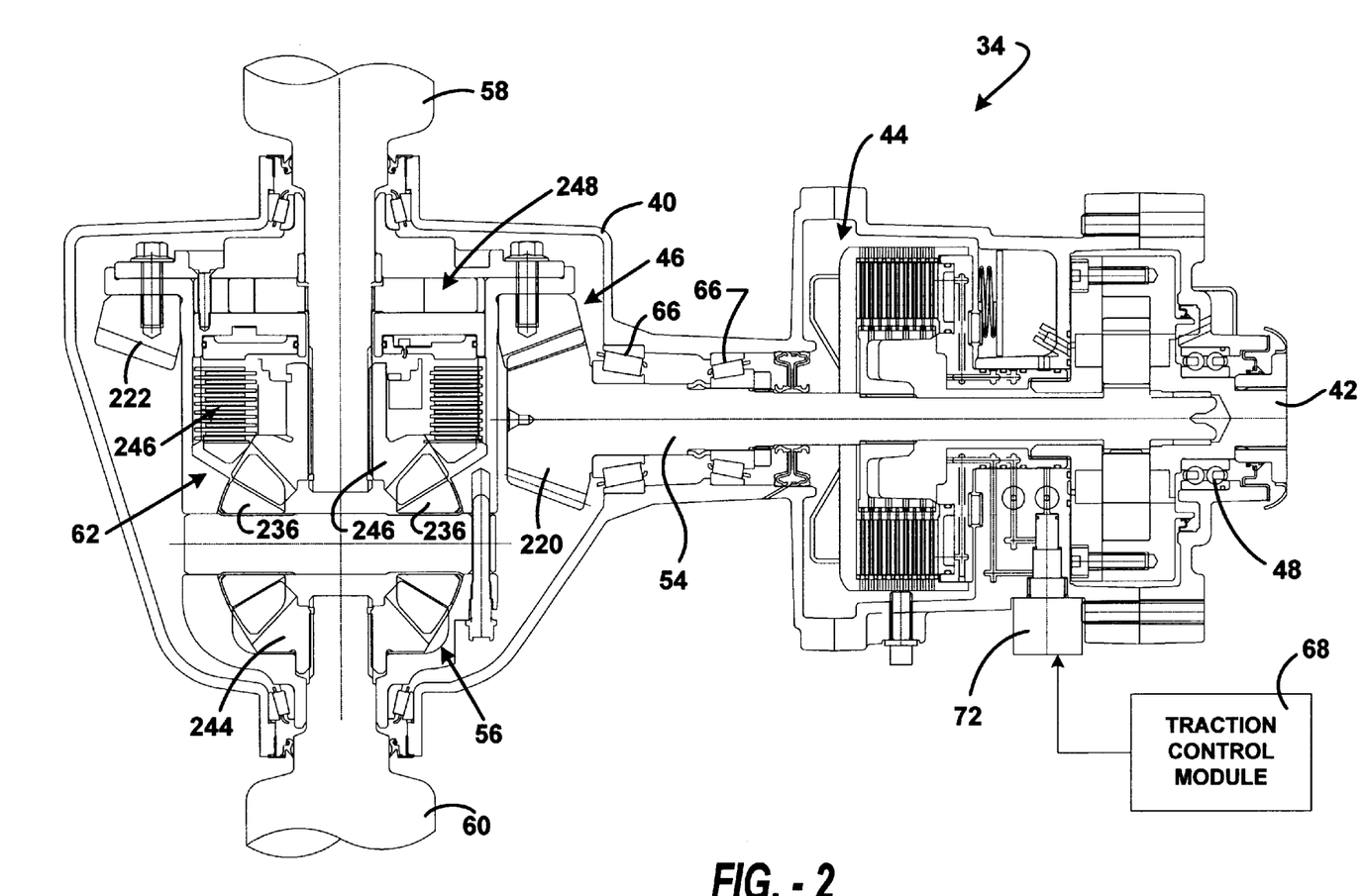
FIG. 2 is a sectional view of the secondary drive axle assembly of the present invention.
Figure 3:
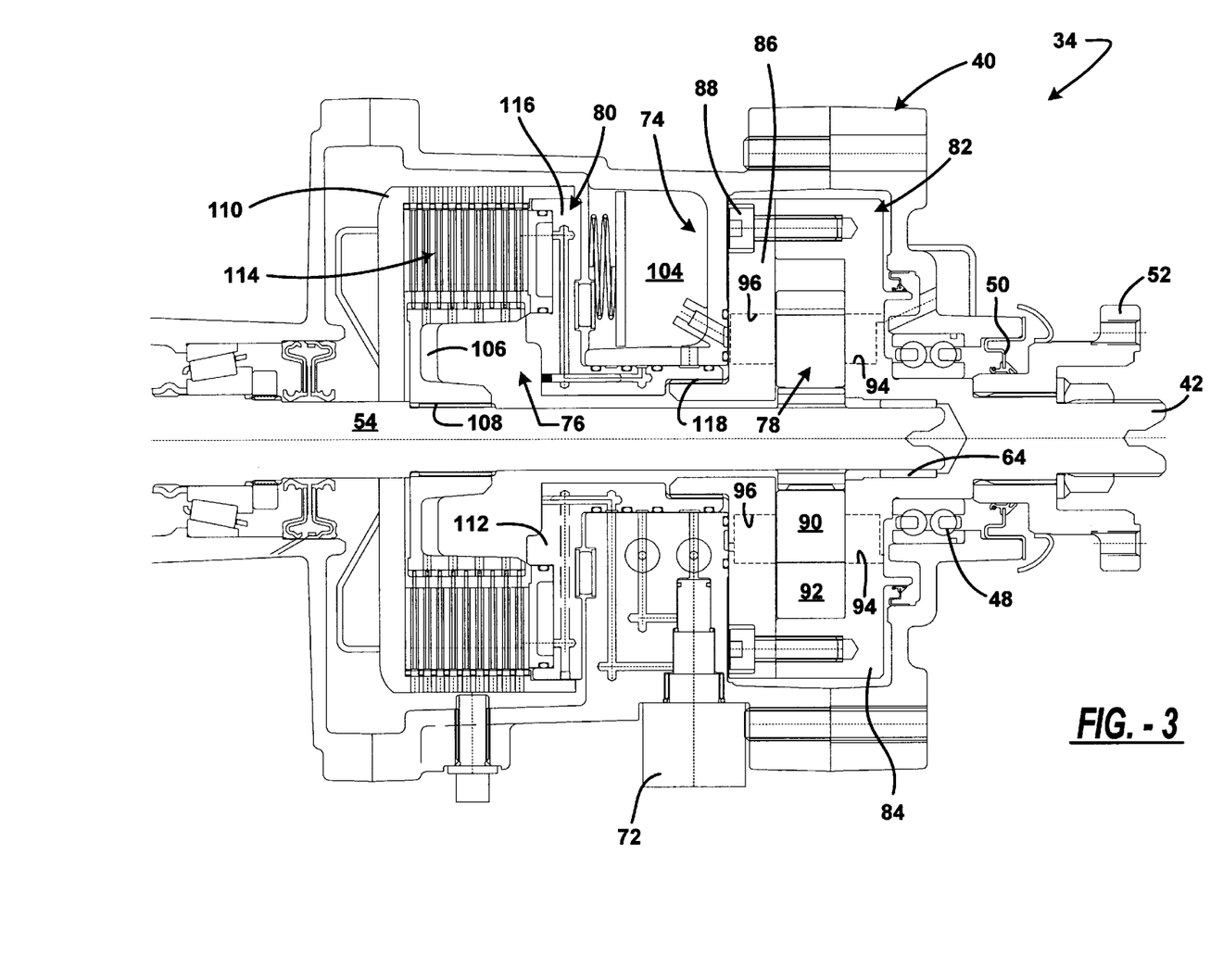
FIG. 3 is a sectional view of an on-demand hydraulic coupling associated with the secondary drive axle assembly.

Shafts 42 and 54 are rotatable relative to one another, with input shaft 42 being supported by a bearing assembly 64 for rotation relative to pinion shaft 54. Bearing assemblies 66 are also provided for supporting pinion shaft 54 for rotation relative to housing 40. As will become apparent, hydraulic coupling 44 is controlled by an electronic traction control module 68 for automatically controlling torque transfer and speed differentiation between shafts 42 and 54. Electronic traction control module 68 monitors vehicle system information (i.e., via vehicle sensors 69) and hydraulic coupling information (i.e., via coupling sensors 70). Coupling sensors 70 may include, but are not limited to, wheel speed, oil sump temperature, oil outlet temperature, and clutch pressure. Vehicle sensors 69 may include, but are not limited to, wheel speed sensors, brake status sensor, transmission gear sensor, vehicle speed sensor, etc. Control module 68 is operable to control a pulse-width modulated (PWM) flow control valve assembly 72 associated with hydraulic coupling 44.

Figure 4:
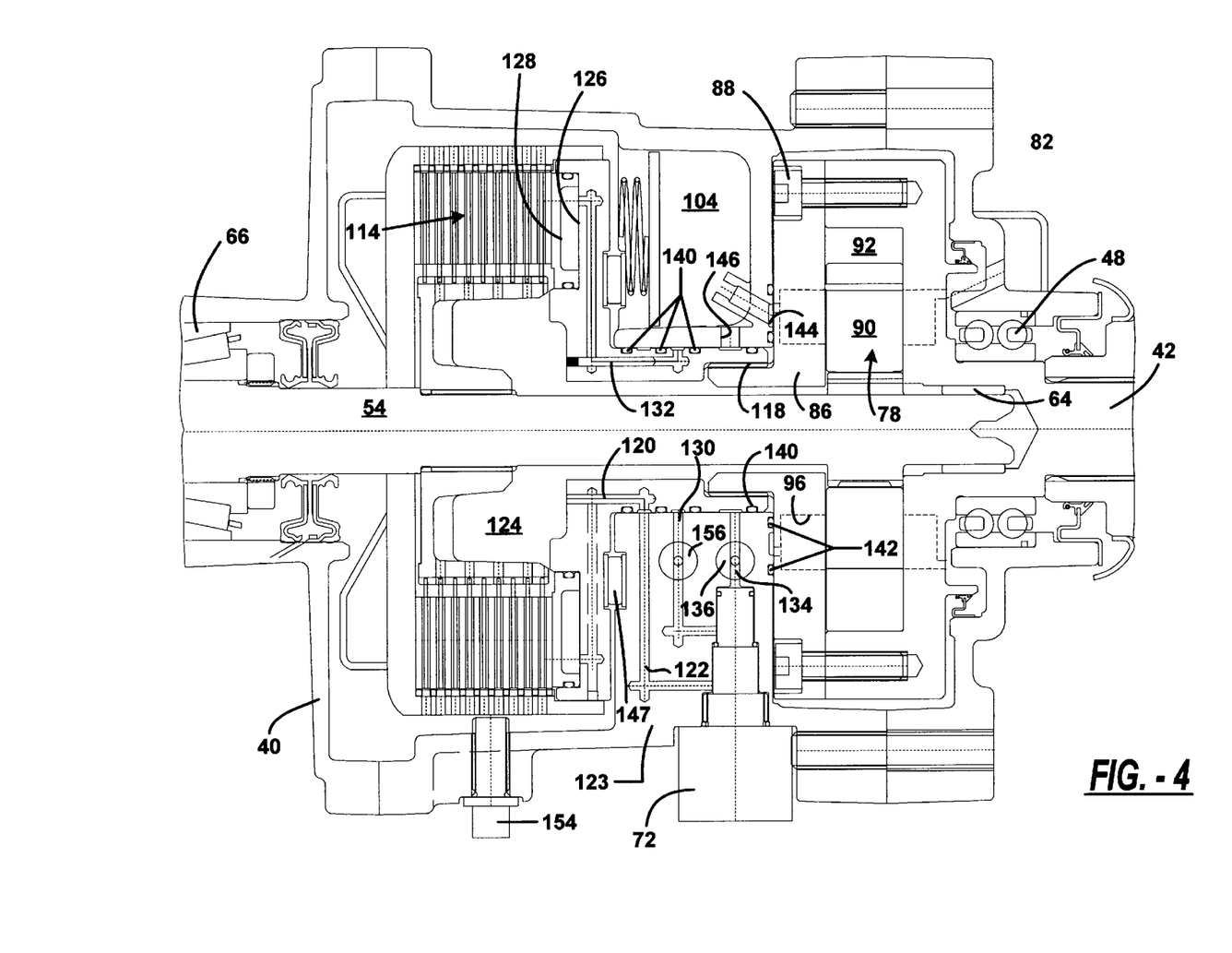
FIG. 4 is an enlarged partial view taken from FIG. 3 showing components of the hydraulic coupling in greater detail.

In general, hydraulic coupling 44 comprises two portions: an actuator assembly 74, and a transfer clutch 76 for transferring drive torque from a faster rotating shaft to a slower rotating shaft in response to excessive speed differentiation therebetween. Transfer clutch 76 is a hydraulically-actuated multi-plate clutch assembly operably coupled between input shaft 42 and pinion shaft 54. Actuator assembly 74 includes a hydraulic pump 78 and a piston assembly 80. Hydraulic pump 78 is confined within a cover assembly 82 which includes a cylindrical outer drum 84 and a cover plate 86 secured via fasteners 88 thereto. Cover assembly 82 is fixed for rotation with input shaft 42 and, in the embodiment shown, outer drum 84 is integral with input shaft 42. Preferably, hydraulic pump 78 is a bidirectional gerotor pump having a first toothed pump member 90 fixed (i.e., splined) for rotation with pinion shaft 54, and a second toothed pump member 92 journalled in an eccentric chamber formed in outer drum 84. With such an arrangement, relative rotation between input shaft 42 and pinion shaft 54 results in a pumping action which draws fluid from one of a pair of inlet chambers 94 on the suction side of pump 78 to a corresponding outlet chamber 96 on the discharge side of pump 78. To facilitate pumping action in both directions of rotation, hydraulic pump 78 includes suitable one-way check valves similar to the arrangement shown in commonly-owned U.S. Pat. No. 6,041,903 which is incorporated by reference. Specifically, a pair of one-way check valves 98 are installed in the hydraulic circuit between a fluid sump 100 and inlet chambers 94 to maintain a supply of fluid therein when pump 78 is static. Likewise, a second pair of check valves 102 are located in the fluid circuit between outlet chambers 96 and an internal accumulator 104 to maintain pressure therein. Inlet chambers 94 are in fluid communication with fluid-filled sump 100 which is located within housing 40.

Transfer clutch 76 includes a clutch hub 106 fixed via a splined connection 108 to pinion shaft 54, an outer drum 110 coupled via a piston housing 112 to cover assembly 82, and a clutch pack 114 having a plurality of inner clutch plates fixed (i.e., splined) to clutch hub 106 that are interleaved with a plurality of outer clutch plates fixed (i.e., splined) to outer drum 110. Outer drum 110 is journalled for rotation relative to pinion shaft 54. In addition, outer drum 110 is rigidly connected (i.e., welded) to an end plate segment 116 of piston housing 112 which, in turn, is fixed via splined connection 118 to cover plate 86. A first exhaust passage 120 formed in housing 112 and communicates with a second exhaust passage 122 formed in a valve body section 123 of housing 40 for exhausting fluid through PWM flow control valve assembly 72 into a clutch chamber 124 to provide an adequate supply of lubricating fluid for cooling and lubricating clutch pack 114.

Piston assembly 80 includes a piston chamber 126 that is formed in plate segment 116 of piston housing 112, and an actuation member or piston 128 disposed in annular piston chamber 126. Piston 128 is supported for axial sliding movement within piston chamber 126 relative to interleaved multi-plate clutch pack 114 for selectively applying a compressive clutch engagement force thereon, thereby transferring drive torque from input shaft 42 to pinion shaft 54 or vise versa.

A first fluid supply passage 130 is formed in valve body section 123 of housing 40 between PWM flow control valve assembly 72 and piston housing 112. First supply passage 130 communicates with a second supply passage 132 formed in piston housing 112 which communicates with piston chamber 126. An inlet passage 134 is formed in housing 40 for providing fluid communication between outlet chamber 96 of pump 78 and the inlet to PWM flow control valve assembly 72. A pressure relief valve 136 is provided in inlet passage 134 for preventing the pressure delivered to control valve assembly 72 from exceeding a predetermined maximum level.

The amount of drive torque transferred is proportional to the magnitude of the clutch engagement force exerted by piston 128 on clutch pack 114 which, in turn, is a function of the fluid pressure within piston chamber 126. The magnitude of the control pressure (Pc) delivered to piston chamber 126 is determined by PWM flow control valve assembly 72 which has a moveable valve element, the position of which is controlled by an electric control signal generated by control module 68. For example, control valve assembly 72 may be a variable force solenoid of valve using a pulse width modulation control strategy. The remaining fluid is exhaust through passages 120 and 122 at an exhaust pressure ($P_E$) which is the difference between the pump pressure $P_G$ generated by gerotor pump 78 and the control pressure $P_C$. As is known, the control pressure $P_C$ can be varied with precise control due to the use of PWM valve 72.

As seen, ring seals 140 are provided for sealing piston housing 112 for rotation relative to valve body section 123 of housing 40. Moreover, ring seals 142 are provided between cover plate 86 and valve body section 123 of housing 40 to provide a fluid tight seal therebetween. An annular chamber 144 formed in housing 40 provides fluid communication between outlet chambers 96 and an internal accumulator 104 via flow passage 145. A second flow passage 146 communicates with a circumferential chamber formed in piston housing 112 which communicates with inlet passage 134. A thrust bearing 147 is shown between housing 40 and plate segment 116 of piston housing 112.

It was previously noted that electronic control module 68 monitors vehicle system information and certain hydraulic coupling information including wheel speed, oil sump temperature, the oil outlet temperature, and clutch pressure. In particular, the wheel speeds are detected by four (4) wheel speed sensors 150A–105D which are disposed on, or in close proximity to, each of the vehicles' wheels. The oil sump temperature is measured by a first temperature sensor 152 which is disposed in oil sump 100. The oil outlet temperature is detected by a second temperature sensor 154 that is located in proximity to clutch pack 114 in clutch chamber 124. The clutch pressure is detected by a clutch pressure sensor 156 which may be disposed in piston chamber 126 or in supply passage 130.

The electronic control module 68 employs a main algorithm which determines the desired clutch pressure based upon the difference in front wheel and rear wheel speed ($\Delta s$). The present invention functions to modulate the clutch apply pressure through the use of PWM solenoid valve 72 with the main algorithm control logic and closed loop control. The duty cycle of the PWM control valve 72 is controlled electronically to control the level of fluid pressure applied to piston 128. Lacking any difference in speed between shafts 42 and 54, pump 78 turns as a unit and creates no hydraulic flow. However, accumulator 104 maintains the pump pressure at inlet 134 of control valve 72.

Upon introduction of differential speeds, the pump elements begin relative motion and commence hydraulic flow. Pulsations in pressure due to gerotor lobes may need to be dampened with the accumulator or other suitable means. The PWM valve duty cycle is controlled electronically by electronic control module 68 based upon the logic of the main algorithm and inputs from wheel speed sensors 150A–150D (ABS), pressure transducer 156 and temperature sensors 152 and 154. A second pressure transducer 160 can be used to provide a pressure signal to controller 68 from inlet passage 134. The wheel speed sensors are used to control the duty cycle of the PWM valve 72 that, in turn, controls the pressure being fed to piston chamber 126. They also signal controller 68 that a non-standard tire size (mini-spare) is on the vehicle so that the system can be deactivated or the operating characteristics can be changed.

Figure 5:
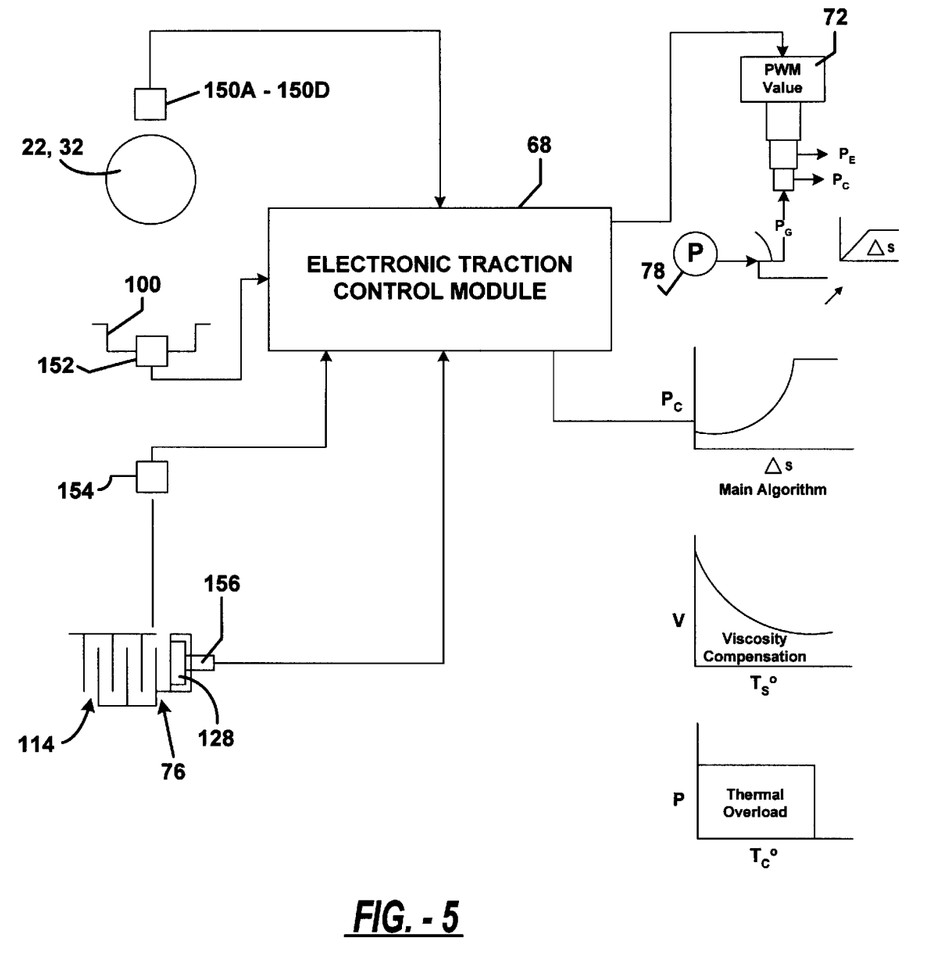
FIGS. 5 and 6 are schematic diagrams illustrating a hydraulic control circuit associated with the on-demand hydraulic coupling shown in FIG. 3.
Figure 6:
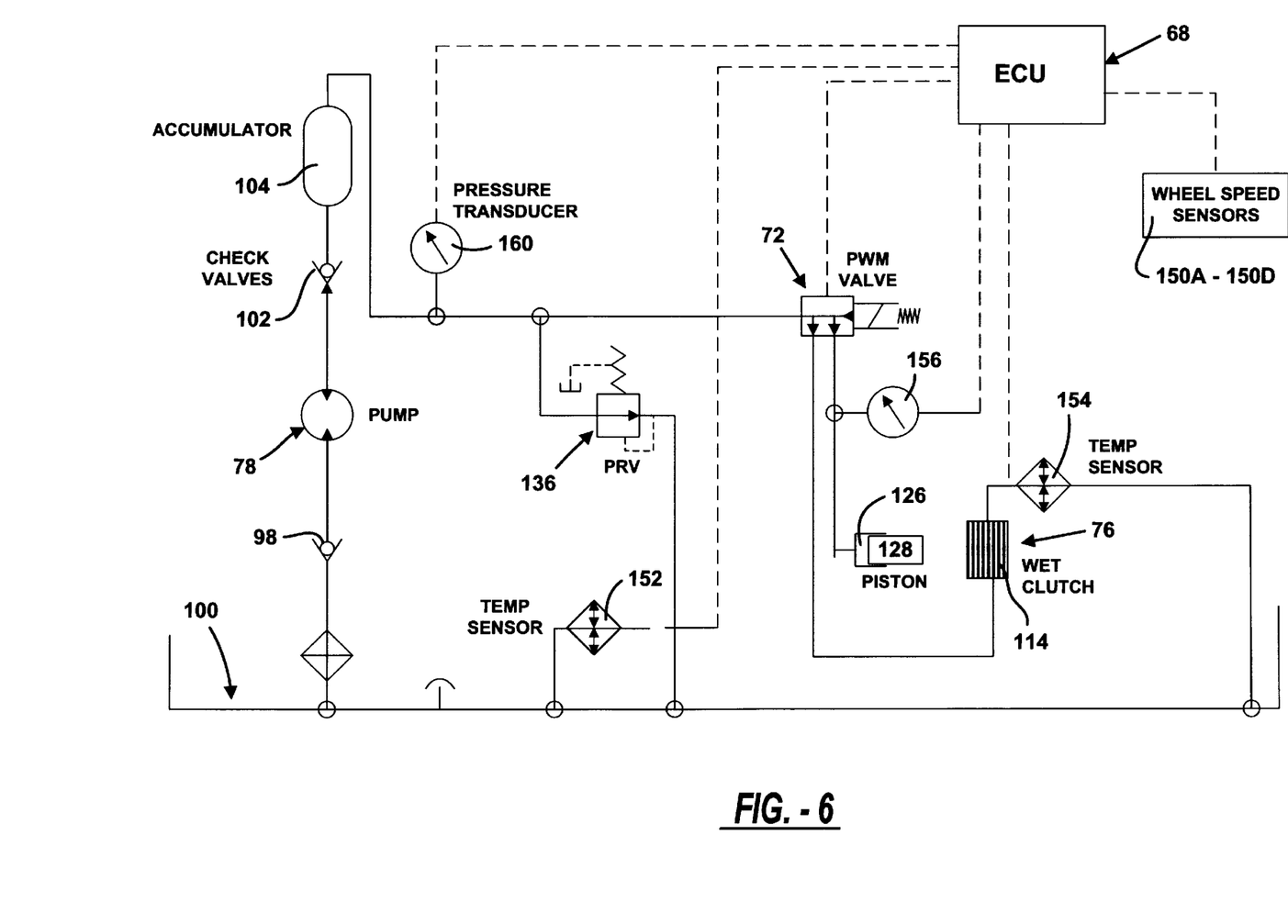

Pressure transducer 156 signals controller 68 how much torque is being transferred so that the logic can control the torque according to predetermined requirements. It also can be used to limit the maximum torque transfer so that the system components can be down sized for mass and cost savings. Sump temperature sensor 152 is used to compensate for fluid viscosity changes on the inlet side of pump 78. An exemplary viscosity compensation chart is shown in FIG. 5 (labeled "viscosity compensation") with the fluid viscosity (V) decreasing as the sump fluid temperature ($T_S$) increases. The clutch outlet oil temperature sensor 154 is used to deactivate transfer clutch 76 during thermally abusive operation, thereby preventing clutch damage. An exemplary clutch deactivation curve is shown in FIG. 5 (labeled "thermal overload").

Figure 7:
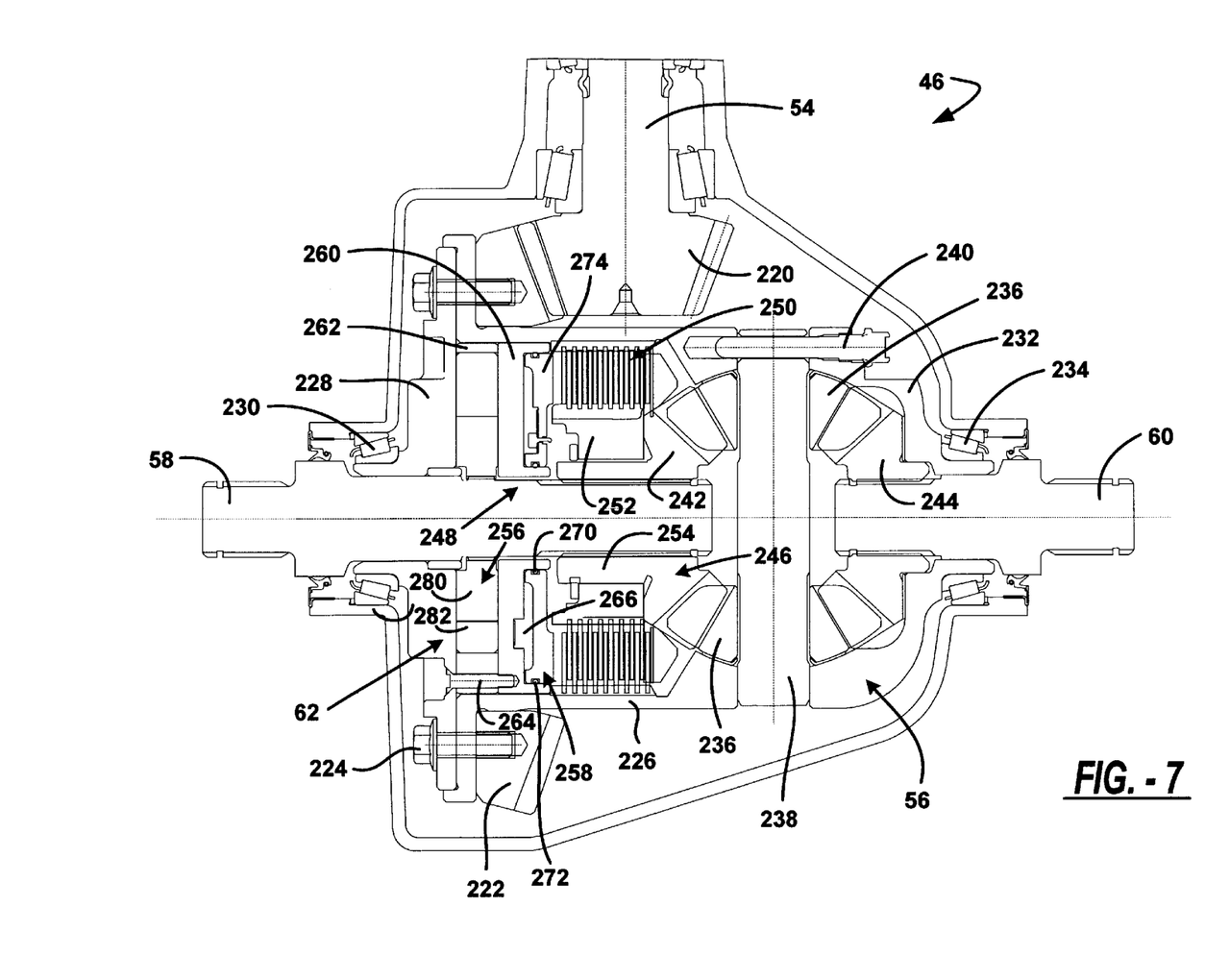
FIG. 7 is a sectional view of a differential drive module associated with the secondary drive axle of the present invention.

Referring primarily now to FIG. 7, the components of drive module 46 will be described. A drive pinion 220 is formed at the end of pinion shaft 54 and is meshed with a bevel ring gear 222 fixed via bolts 224 to a drive casing 226. An end cap 228 is also fixed via bolts 224 to drive casing 226 and is supported for rotation relative to housing 40 via a bearing assembly 230. A second end cap 232 is formed at the opposite end of drive casing 226 and is rotatably supported on housing 40 via a bearing assembly 234. Bevel gearset 56 includes a pair of pinion gears 236 rotatably supported on opposite ends of pinion shaft 238 that is non-rotatably fixed to drive casing 226 via a retainer screw 240. Gearset 56 further includes a first side gear 242 splined for rotation with first output shaft 58 and a second side gear 244 splined for rotation with second output shaft 60.

Second hydraulic clutch 62 includes a biasing clutch 246 and a clutch actuator 248. Biasing clutch 246 is a multi-plate clutch assembly having a clutch pack 250 of alternately interleaved inner and outer clutch plates that are respectively splined to a clutch hub 252 and drive casing 226. Hub 252 is splined to an axial hub section 254 of first side gear 242. Clutch actuator 248 includes a fluid pump 256 and a piston assembly 258. Pump 256 is a gerotor pump assembly disposed in a pump chamber formed between end cap 228 and a piston housing 260. An eccentric outer ring 262 of gerotor pump 256 and piston housing 260 are fixed for rotation with drive casing 226 via bolts 264. Piston assembly 258 is disposed in a piston chamber 266 formed in piston housing 260. Piston assembly 258 may be similar in function to that of piston assembly 96 such that a control valve (not shown) similar to control valve 116 can be used. Seal rings 270 and 272 seal a piston 274 of piston assembly relative to piston housing 260. If piston assembly 258 is similar to piston assembly 96, the hydraulic circuit shown in FIG. 5 would be applicable to illustrate the operation of second hydraulic coupling 62.

Pump 256 includes a pump ring 280 splined to first output shaft 68, and a stator ring 282 disposed between pump ring 280 and eccentric ring 262. The external lobes of pump ring 280 mesh with the internal lobes of stator ring 282, with stator ring 282 journalled in an eccentric aperture formed in eccentric rig 262. Relative rotation between drive casing 226 and first output shaft 58 generates a fluid pumping action. Check valves (not shown) are retained in inlet ports formed in end cap 228 while one-way check valves (not shown) are retained in flow passages formed in piston housing 260 between the outlet of pump 256 and piston chamber 266. These clutch valves function similarly to check valves 98 and 102 described in association with first hydraulic coupling 44. A pressure regulator valve is mounted in a by-pass passage through piston 274 to control pressurization of piston chamber 266 so as to allow a limited amount of unrestrained inter-wheel speed differentiation, such as during turns.

This arrangement of an in-line electronically-controlled hydraulic coupling 44 between prop shaft 78 and pinion shaft 54 permits adaptive "on-demand" transfer of drive torque to secondary driveline 16. Thus, all-wheel drive traction control is provided when needed in response to a loss of traction between the front and rear drivelines. Combining the automated in-line coupling with a passively-controlled second hydraulic coupling 62 in drive module 46 provides "front-to-back" and "side-to-side" traction control that is well suited for use in conjunction with a secondary driveline system. It is further contemplated that passive hydraulic coupling 62 could be replaced with an actively-controlled hydraulic coupling similar to hydraulic coupling 44 with traction control module 68 used to control speed differentiation and torque transfer between rear output shafts 58 and 60 based on control algorithms and logic.

Figure 8:
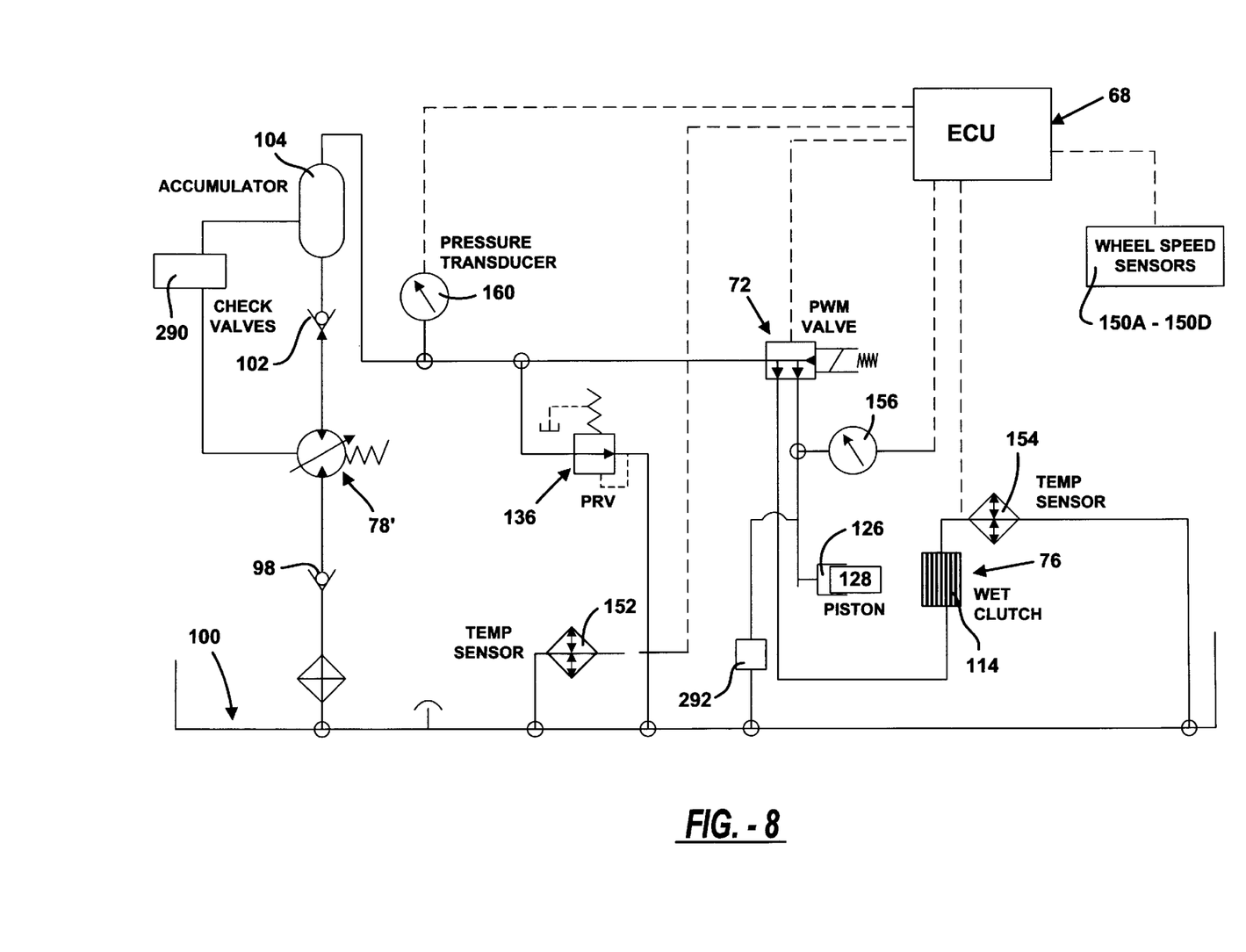
FIG. 8 is a schematic diagram illustrating a hydraulic circuit for an on-demand hydraulic coupling equipped with a variable displacement pump and a torque limiting feature.

The first embodiment of drive axle assembly 34 was equipped with a positive displacement pump assembly 78 mechanically driven by relative rotation between input shaft 42 and pinion shaft 54. In contrast, FIG. 8 illustrates a hydraulic circuit for hydraulic coupling 44 of drive axle assembly 34 which is now equipped with a bi-directional variable displacement pump 78' which can be driven either electrically or mechanically. To reduce system power requirements, variable displacement pump 78' can be of the vane-type used in many automatic transmissions that is driven at propshaft speed by input shaft 42. Accumulator 104 again is used to retain pressure at the inlet of control valve assembly 72 so as to assure immediate system activation upon demand. A pressure control or relief valve 290 is located in the hydraulic circuit between accumulator 104 and variable displacement pump 78' and a torque limiting valve 292 is located in the hydraulic circuit between piston chamber 126 and the control pressure outlet of control valve assembly 72. Torque limiting valve 292 is preferably an electrically-controlled solenoid valve receiving control signals from ECU 68. However, a mechanical pressure limiting valve is also contemplated for use with torque limiting valve 292.

What is claimed is:

1. A power transfer assembly for transferring drive torque from a vehicular powertrain to a pair of wheels comprising:
    an input member adapted to receive drive torque from the powertrain;
    an output member adapted to transmit drive torque to the wheels;
    a torque coupling for transferring drive torque from said input member to said output member, said torque coupling including a clutch pack operably connected between said input member and said output member, an actuator for applying a clutch engagement force on said clutch pack in response to fluid pressure exerted thereon, and a fluid control system capable of varying the fluid pressure exerted on said actuator, said fluid control system includes a source of hydraulic fluid, and a control valve for controllably regulating the fluid pressure exerted on said actuator;
    a speed sensor for determining a speed difference between said input member and said output member;
    a first temperature sensor for detecting the fluid temperature at said fluid source;
    a second temperature sensor for detecting the fluid temperature at said clutch pack; and
    a control unit receiving speed signals from said speed sensor and temperature signals from said first and second temperature sensors and generating an electric control signal in response thereto, said electric control signal is supplied to said control valve for varying the fluid pressure as a function of said electric control signal.

2. The power transfer assembly of claim 1 wherein said control unit includes logic for controlling actuation of said control valve in response to predetermined relationships related to the speed difference between said input member and said output member.

3. The power transfer assembly of claim 2 wherein said logic further includes a sub-routine to compensate for changes in fluid viscosity based on the fluid temperature detected by said first temperature sensor.

4. The power transfer assembly of claim 3 wherein said control unit is adapted to open said control valve and release said clutch pack when the fluid temperature detected by said second temperature sensor exceeds a predetermined value.

5. The power transfer assembly of claim 1 wherein said output member includes a differential assembly operably interconnecting the pair of wheels.

6. The power transfer assembly of claim 1 wherein said fluid control system further includes a pump driven by said input member for supplying fluid to said actuator, and wherein said control valve is operably disposed between said pump and said actuator.

7. The power transfer assembly of claim 6 wherein said pump is a gerotor pump adapted to generate a fluid pumping action in response to speed differentiation between said input and output members.

8. The power transfer assembly of claim 1 further comprising a drive module having a drive case driven by said output member, a pair of axleshafts adapted for connection to the pair of wheels, and a differential assembly interconnecting said drive case to said axleshafts to facilitate speed differentiation between said axleshafts.

9. The power transfer assembly of claim 8 further comprising a second torque coupling operably disposed between said drive case and one of said axleshafts.

10. A power transfer assembly for transferring drive torque from a vehicular powertrain to a pair of wheels, comprising:
    an input shaft adapted to receive drive torque from the powertrain;
    a pinion shaft;
    a torque coupling operable for transferring drive torque from said input shaft to said pinion shaft, said torque coupling including a clutch pack interconnected between said input shaft and said pinion shaft, a piston supported in a piston chamber for movement in response to fluid pressure to apply a clutch engagement force to said clutch pack for transferring drive torque to said pinion shaft, a source of hydraulic fluid, a pump having an inlet in communication with said fluid source and an outlet in communication with said piston chamber, and a control valve for regulating the control pressure of hydraulic fluid supplied by said pump to said piston chamber;
    speed sensors for detecting the rotary speeds of said input shaft and said pinion shaft;
    a first temperature sensor for detecting the fluid temperature at said fluid source;
    a second temperature sensor for detecting the fluid temperature at said control valve; and
    a controller for receiving sensor signals from said speed sensors and said first and second temperature sensors and generating an electric control signal in response thereto that is sent to said control valve to control movement of said piston.

11. The power transfer assembly of claim 10 further comprising a drive module for transferring drive torque from said pinion shaft to the wheels, said drive module including a drive case driven by said pinion shaft and a differential unit interconnecting said drive case to the wheels.

12. The power transfer assembly of claim 10 wherein said control valve has an inlet in communication with said pump outlet, a first outlet in communication with said piston chamber, and a second outlet in communication with a clutch chamber within which said clutch pack is disposed.

13. The power transfer assembly of claim 12 wherein said second temperature sensor is disposed between said first outlet of said control valve and said piston chamber.

14. The power transfer assembly of claim 12 wherein said second temperature sensor is disposed between said second outlet of said control valve and said clutch chamber.

15. The power transfer assembly of claim 10 wherein said controller includes logic for controlling actuation of said control valve in response to predetermined relationships related to speed differences between said input shaft and said pinion shaft.

16. The power transfer assembly of claim 15 wherein said logic further includes a sub-routine to compensate for changes in fluid viscosity within said fluid source based on the fluid temperature detected by said first temperature sensor.

17. The power transfer assembly of claim 10 wherein said controller is adapted to open said control valve and release engagement of said clutch pack when the fluid temperature detected by said second temperature sensor exceeds a predetermined value.

18. The power transfer assembly of claim 10 wherein said coupling is disposed within a housing which also rotatably supports said input shaft and pinion shaft, wherein said pump is adapted to generate a pumping action in response to speed differentiation between said pinion shaft and said input shaft, and wherein said control valve is mounted to a valvebody segment of said housing.

19. An all-wheel drive vehicle comprising:

a powertrain including an engine and a transmission;

a primary driveline driven by said powertrain for transferring drive torque to a pair of primary wheels;

a secondary driveline including a drive axle assembly and a pair of secondary wheels, said drive axle assembly having an input member driven by said powertrain, a drive case, a pair of axleshafts connected to said secondary wheels, a differential interconnecting said drive case to said axleshafts so as to permit speed differentiation between said axleshafts, and a torque coupling for transferring drive torque from said input member to said drive case, said torque coupling including a clutch pack operably connected between said input member and said drive case, an actuator for applying a clutch engagement force on said clutch pack in response to fluid pressure exerted thereon, and a fluid control system capable of varying the fluid pressure exerted on said actuator, said fluid control system includes a source of hydraulic fluid, and an electric control valve for controllably regulating the control pressure exerted on said actuator;

speed sensors for determining a speed difference between said input member and at lease one of said drive case and said axleshafts;

a first temperature sensor for detecting the fluid temperature at said fluid source;

a second temperature sensor for detecting the fluid temperature at said clutch pack; and a traction control unit receiving speed signals from said speed sensors and temperature signals from said first and second temperature sensors and generating an electric control signal in response thereto, said electric control signal is supplied to said electric control valve for varying the control pressure as a function of said electric control signal.

20. The all-wheel drive vehicle of claim 19 wherein said traction control unit includes logic for controlling actuation of said control valve in response to predetermined relationships related to vehicle operating characteristics.

21. The all-wheel drive vehicle of claim 20 wherein said logic further includes a sub-routine to compensate for changes in fluid viscosity within said fluid source based on the fluid temperature detected by said first temperature sensor.

22. The all-wheel drive vehicle of claim 19 wherein said traction control unit is adapted to open said control valve and release engagement of said clutch pack when the fluid temperature detected by said second temperature sensor exceeds a predetermined value.

23. The all-wheel drive vehicle of claim 19 further comprising a second hydraulic coupling operably disposed between said drive case and at least one of said axleshafts for limiting excessive speed differentiation between the wheels.

24. An all-wheel drive vehicle comprising:

a powertrain including an engine and a transmission;

a primary driveline driven by said powertrain for transferring drive torque to a pair of primary wheels;

a power take-off unit driven by said primary driveline;

a secondary driveline including a drive axle assembly and a pair of secondary wheels, said drive axle assembly having an input shaft driven by said power take-off unit, a pinion shaft, and a torque coupling operable for transferring drive torque from said input shaft to said pinion shaft, said torque coupling including a clutch pack interconnected between said input shaft and said pinion shaft, a piston supported in a piston chamber for movement in response to fluid pressure to apply a clutch engagement force to said clutch pack for transferring drive torque to said pinion shaft, a pump having an inlet in communication with a sump and an outlet in communication with said piston chamber, and a control valve for regulating the control pressure of hydraulic fluid supplied to said piston chamber;

speed sensors for detecting the rotary speeds of said input shaft and said pinion shaft;

a first temperature sensor for detecting the temperature of fluid in said sump, a second temperature sensor for detecting the fluid temperature at said control valve; and a controller for receiving sensor signals from said speed sensors and said first and second temperature sensors and generating an electric control signal in response thereto that is sent to said electric control valve to control movement of said piston.

25. The all-wheel drive vehicle of claim 24 wherein said controller includes logic for controlling actuation of said control valve in response to predetermined relationships related to speed differences between said input shaft and said pinion shaft.

26. The all-wheel drive vehicle of claim 25 wherein said logic further includes a sub-routine for compensating for changes in fluid viscosity within said fluid source based on the fluid temperature detected by said first temperature sensor.

27. The all-wheel drive vehicle of claim 24 wherein said controller is adapted to open said control valve and release engagement of said clutch pack when the fluid temperature detected by said second temperature sensor exceeds a predetermined value.

* * * * *